United States Patent [19]

Scobie et al.

[11] Patent Number: 4,828,221

[45] Date of Patent: May 9, 1989

[54] VALVE ASSEMBLY

[75] Inventors: William B. Scobie; Paul A. Yohner, both of Houston, Tex.

[73] Assignee: Keystone International, Inc., Houston, Tex.

[21] Appl. No.: 118,188

[22] Filed: Nov. 6, 1987

[51] Int. Cl.$^4$ .................................................. F16K 1/22
[52] U.S. Cl. .................................... 251/308; 403/362; 411/426; 411/393
[58] Field of Search ........................ 251/308; 403/362; 411/426, 393

[56] References Cited

U.S. PATENT DOCUMENTS

| | | | |
|---|---|---|---|
| 3,140,635 | 7/1964 | Davidson | 403/362 X |
| 3,326,584 | 6/1967 | Tann | 411/393 X |
| 4,483,513 | 11/1984 | Summers | 403/362 X |

FOREIGN PATENT DOCUMENTS 2710104 9/1977 Fed. Rep. of Germany ...... 251/308

Primary Examiner—Arnold Rosenthal
Attorney, Agent, or Firm—Browning, Bushman, Zamecki & Anderson

[57] ABSTRACT

An improved rotary valve assembly having a valve body, a valve element rotatably disposed in the body and having a first bore which is coaxial with the axis of rotation of the valve element and a shaft member rotatably mounted in the valve body and extending into the first bore into the valve element, the valve element further having a second bore which is transverse to and intersects the first bore, a threaded torque transmission member being threadedly received in the second bore and having an end face which abuts the shaft member whereby the torque transmission member can be compressively urged against the shaft member, the first bore in the valve element having an abutment surface which is generally opposite the second bore, the shaft member having an outer surface defining an engagement portion which is engageable with the abutment surface, either the abutment surface or the engagement portion of the outer surface of the shaft being provided with friction-inducing formations such that when the torque transmission member is compressively urged against the shaft member, the friction-inducing formations on either the abutment surface or the engagement portion of the outer surface of the shaft are urged into biting or frictional engagement with the other of the abutment surface or the engagement portion of the outer surface of the shaft.

8 Claims, 2 Drawing Sheets

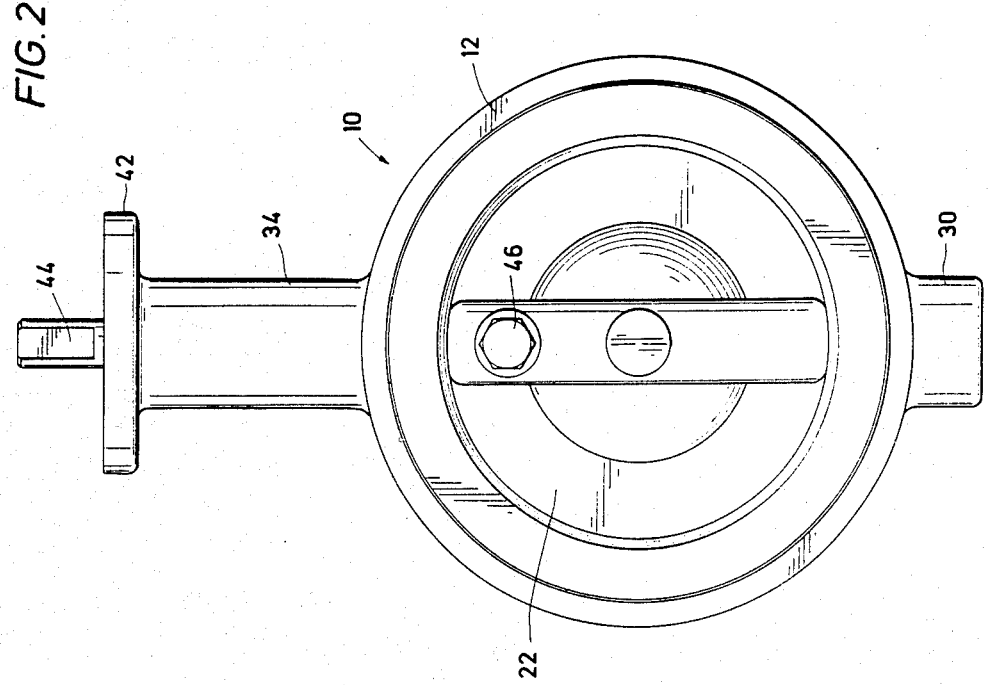
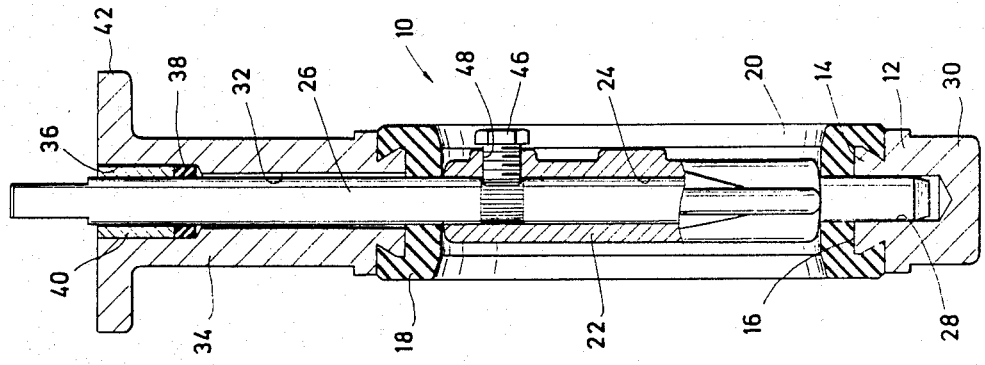
FIG. 2
FIG. 1

VALVE ASSEMBLY

BACKGROUND OF THE INVENTION

1. Field of the Invention

The present invention pertains to valves having rotary valve elements mounted on shaft members or trunnions which are journaled in the valve body and, more particularly, to an assembly for securing the valve element to the shaft member.

While the invention is particularly suited to disk-type or butterfly valves, it may also be used with other types of rotary valves such as ball valves, plug valves, etc. In typical valve assemblies, the valve element is mounted in the valve body using a shaft which is rotatably journaled in the valve body. One end of the shaft member extends outwardly of the valve body to provide a valve stem portion which can be operated by a handle or valve actuator. It is necessary to fix the valve element with respect to the shaft so that they will rotate as a unit when the stem is turned.

The performance of such rotatable valves is, to a great extent, determined by the quality and integrity of the connections between the shaft member and the valve element. These connections should be capable of transmitting torque loads of high magnitude in either direction with minimum rotative and axial play between the shaft member and valve element. Ideally, the connection should provide for such torque transmission while minimizing the consequent reduction in torque carrying capacity of the shaft member. It is also desirable that the connections be designed so that the shaft member, valve element and associated parts can be easily and inexpensively manufactured with conventional equipment so that the apparatus can be easily assembled and disassembled.

2. Description of the Prior Art

In conventional trunnion mounted valve elements, trunnions or shaft members are usually fixed to the valve element either by pins or some type of key. In the pin-type of connection, the pin extends through bores in the shaft and valve element respectively. It is not necessary only that these bores be perfectly aligned but also that there be an extremely tight fit between the pin and the bores to avoid play. Thus, close tolerances and/or machining of the parts during assembly are required resulting in high costs and inconvenience in the use of the pin-type connection.

In the key-type of connection, on the other hand, the shaft member must be machined to receive the key. This may involve altering the circular cross-sectional configuration of one section of the shaft to make it square, hexagonal, DD or the like. Alternatively, a slot may be cut in the shaft member to receive the key. In either case, a substantial amount of metal is removed from the shaft member in the machined section diminishing its cross-sectional area. This in turn drastically reduces the torsional strength or torque carrying capacity of the shaft member. For example, by machining the shaft section from circular to a square cross-sectional configuration, its torsional strength is reduced by over sixty percent. Moreover, key connections, like pin connections, require close tolerances for satisfactory performance which in turn necessitates complex manufacturing processes resulting in high costs. Moreover, conventional key connections only prevent relative rotation between the shaft members and valve elements and do not provide axial restraint. Accordingly, additional means must be provided for fixing the shaft members axially with respect to the valve element thus further raising the cost of manufacture.

Another disadvantage of both pinned and keyed connections is that even when the necessary tight fits are provided, wear of the parts during use of the valve eventually begins to allow the undesirable play which the tight fits prevented.

In Australian Pat. No. 515,047, incorporated herein by reference, there is disclosed an assembly for securing a rotary element such as a valve element to a shaft which utilizes a torque transmission member compressively urged against a flat on the shaft member. The torque transmission member is threadedly received in a bore which intersects a bore in the valve element through which the shaft extends. The torque transmission member has a substantially flat, circular end surface which lies parallel to and abuts the flat. The diameter of the end face of the torque transmission member is greater than the distance between the side edges of the flat but less than or substantially equal to the distances between the end edges so that the end face extends laterally beyond the side edges of the flat but lies between the end edges.

SUMMARY OF THE INVENTION

It is therefore an object of the present invention to provide a rotary valve assembly having improved means for securing the valve element to the shaft for joint rotation.

Another object of the present invention is to provide a rotary valve assembly having means providing enhanced frictional engagement between the valve element and the shaft.

Still a further object of the present invention is to provide a means for preventing relative rotative and/or axial play between the rotary valve element and a valve shaft without the need for close tolerances between the shaft and the torque transmission member.

Yet another object of the present invention is to provide a rotary valve assembly having a simple means for eliminating play which may develop between the valve element and the shaft due to wearing of the interengaged parts.

The above and other objects of the present invention will become apparent from the drawings, the description given herein and the appended claims.

The improved rotary valve assembly of the present invention includes a valve body, a rotary valve element disposed in the body and having a first bore which is coaxial with the axis of rotation of the valve element and a shaft member rotatably mounted in the valve body and extending into the first bore in the valve element. The valve element has a second bore which is transverse to and intersects the first bore. There is a generally cylindrical torque transmission member disposed in the second bore which has an end face abutting the shaft member, there being means for compressively urging the torque transmission member toward the shaft member. The first bore in the valve element has an abutment surface disposed generally opposite the second bore while the shaft member has an outer surface defining an engagement portion engageable with the abutment surface. At least one of either the abutment surface or the engagement portion of the outer surface of the shaft is provided with friction-inducing formations such that when the torque transmission member is compressively urged against the shaft member, the friction-inducing formations on either the abutment surface or the engagement portion of the outer surface of the shaft are urged into biting or frictional engagement with the other of the abutment surface or the engagement portion of the outer surface of the shaft.

BRIEF DESCRIPTION OF THE DRAWINGS

FIG. 1 is an elevational view, partly in section, of the improved valve assembly of the present invention.

FIG. 2 is a front elevational view of the improved valve assembly of the present invention.

DESCRIPTION OF THE PREFERRED EMBODIMENTS

Figure 3:
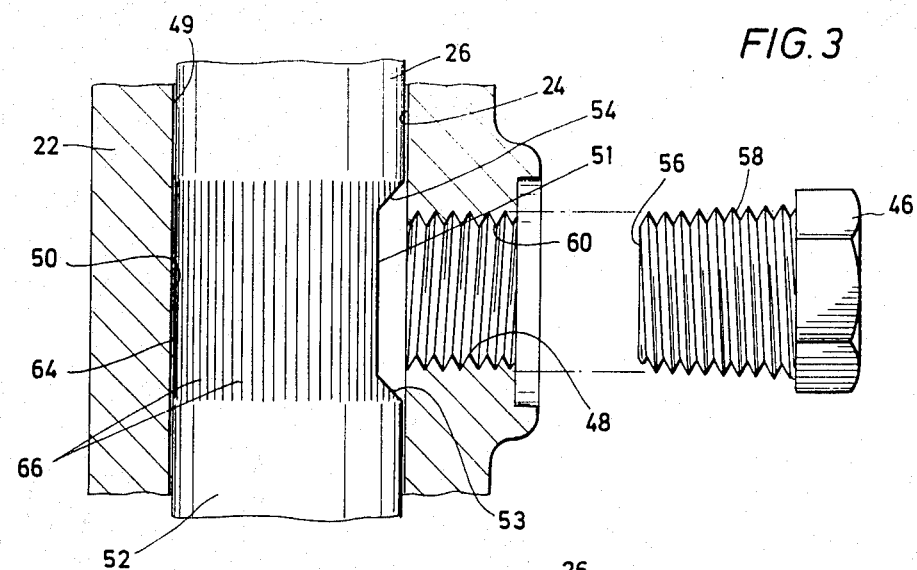
FIG. 3 is an enlarged, fragmentary view, partly in section and exploded, showing the means for securing the rotary valve element in the valve shaft.

Referring now to the drawings, the invention is illustrated as incorporated in a disk or butterfly-type valve assembly, although it will be understood that the invention can be applied to ball valve assemblies and other type valve assemblies employing a rotatable valve element disposed internally of a valve body. Moreover, although the invention will be described with reference to a butterfly valve using a single shaft to rotatably mount the valve element, it will be understood that it is equally applicable to valves which employ two shafts to rotatably mount the valve element in the valve body.

Referring first to FIGS. 1 and 2, there is shown a butterfly valve 10 having a body 12, body 12 having an annular dovetail rib 14 defining a passage 16 through body 12. A generally resilient, annular seat 18 is disposed in body 12, seat 18 being interlocked to annular rib 16. Seat 18 defines a flowway 20 through the valve 10. Disposed in flowway 20 is a disk valve element 22 to control flow through the valve 10. Valve element 22 has a bore 24 therethrough, bore 24 extending generally diametrically across flowway 20. A shaft 26 extends through bore 24, one end of shaft 26 being rotatably journaled in a blind bore 28 in a boss portion 30 formed integrally with valve body 12. The opposite end of shaft 26 extends through a bore 32 formed in a neck portion 34, neck portion 34 being integrally formed with body 12. Bores 32, 24 and 28, as seen, are in register with one another. Neck portion 34 has a counterbore 36 in which are received a seal member 38 and a bearing member 40, thereby permitting shaft 26 to rotate in bore 32 while preventing fluid from leaking out of the valve 10 between the body 12 and shaft 26. A portion of the shaft 26 extends outwardly passed a flange 42 formed integrally with neck 34 and is provided with flats or wrench surfaces 44 to enable valve 10 to be secured to an actuator or to permit shaft 26 to be manually rotated. As will be described more fully hereafter, valve element 22 is locked to shaft 26 for rotation therewith by means of a torque transmission member 46 threadedly received in a threaded bore 48 in valve element 22, torque transmission member 46 having a generally flat end face 56 (FIG. 3) which engages shaft 26 to thereby prevent relative rotation between shaft 26 and valve element 22. Thus, valve element 22 can be rotated, as desired, in unison with shaft 26 to control the flow through valve 10.

Figure 4:
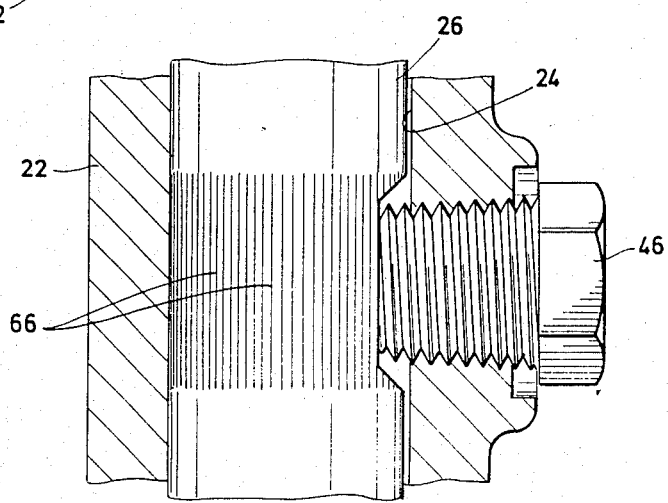
FIG. 4 is a view similar to FIG. 3 showing the valve element secured to the valve shaft.

Referring now to FIGS. 3 and 4, the means of securing the shaft 26 to the valve element 22 is shown in greater detail. As can be seen, bore 48 is generally transverse to and intersects bore 24. Bore 24, is defined by a generally cylindrical surface 49, which includes an abutment surface 50 which is disposed generally opposite the intersection of bore 48 with bore 24, i.e. abutment surface 50 lies diametrically across bore 24 from the intersection of bores 48 and 24. Shaft 26 has an outer cylindrical surface 52 which includes an engagement portion 64, being disposed on the opposite side of shaft 26 from a flat 51 formed on shaft 26 and which intercepts the outer cylindrical surface 52.

Engagement portion 64 is provided with friction-inducing formations which engages abutment surface 50. As shown in the embodiment in FIGS. 3 and 4, the friction-inducing formations comprise knurls 66 which, while shown extending around shaft 26 from one side of flat 50 to the other side of flat 50, need only be on engagement portion 64.

Flat 51 is generally rectangular having axially spaced end edges 53 and 54. It will be appreciated that the flat 51 is continuous with the cylindrical outer surface 52 of shaft 26 at its side edges. The flat 51 has an axial length, i.e. between end edges 53 and 54, which is at least as great as the diameter of the end face 56 of torque transmission member 46. Preferably, the end face 56 of the torque transmission member 46 has a diameter which is greater than the width of the flat, i.e. the distance between the intersection of one side of the flat with the outer cylindrical surface 52 of the shaft 26 and the intersection of the other side of the flat 51 with the outer cylindrical surface 52 of the shaft 26. Accordingly, the end face 56 of the torque transmission member 46 can overlap both sides of the flat 51 on its sides but will lie completely between the end edges 53 and 54. In the preferred case, the length of the flat 51 will be greater than the diameter of the end face 56 of torque transmission member 46 by an amount substantially greater than that which would be allowable by ordinary close machining tolerances. This eliminates the need for machining to such tolerances and also allows the threads of the torque transmission member 46 to extend all the way to the end face 56 even though torque transmission member 46 is not threadedly received in the shaft 26. The end edges 53, 54 provide stop shoulders engageable with the torque transmission member 46 to prevent excessive axial movement.

Accordingly, when torque transmission member 46 is compressively urged through threaded bore 48 such that the end surface 56 engages flat 51 on shaft 26, the engagement portion 64 of the outer surface 52 of shaft 26 will be forced into tight engagement with the abutment surface 50 in valve element 22. Knurls 66 will be formed to bite into abutment surface 50 ensuring tight frictional engagement between shaft 26 and the valve element 22. This will result in greatly enhanced resistance to relative rotational motion between shaft 26 and valve element 22. It will be appreciated that when torque transmission member 46 is in firm abutment with the flat 51, torque will be transmitted between the shaft 26 and the valve element 22 via the torque transmission member 46. This tight abutment also provides axial restraint of shaft 26 with respect to disk 22.

In the preferred case, the torque transmission member 46 is provided with tapered threads 58 while the second threaded bore 48 is provided with parallel threads 60. Accordingly, as the torque transmission member 46 is advanced into the threaded bore 48, a sufficient distance, a portion of the tapered threads 58 will be forced to yield, thereby ensuring that the torque transmission member 46 will not back out of threaded bore 48 during use.

Figure 5:
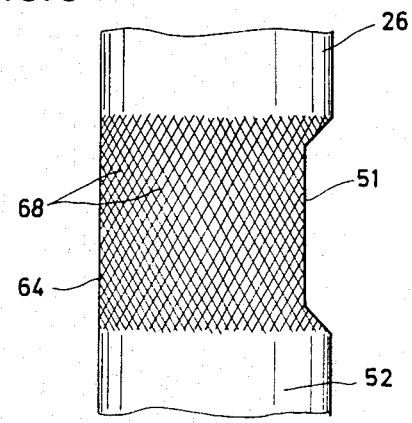
FIG. 5 is an enlarged, fragmentary view showing a modified form of a shaft for use in the improved rotary valve assembly of the present invention.

Referring now to FIG. 5, there is shown a modified form of shaft for use in the rotary valve assembly of the present invention. In the embodiment shown in FIG. 5, the knurls 68 on the outer surface 52 of shaft 26 are in a criss-cross pattern rather than as generally axially extending ridges such as the knurls 66 in FIGS. 3 and 4. The criss-cross knurls 68 shown in FIG. 5 provide enhanced axial restraint of shaft 26 with respect to the valve element 22 as compared with the generally axially extending knurls 66 shown in FIGS. 3 and 4. Again, although the knurls 68 are shown as extending around the outer surface 52 of shaft 26 from one side of flat 51 to the other side of flat 51, it will be appreciated that the knurls 68 need only be on the engagement portion 64 of the outer surface 52 of shaft 26, the engagement portion being disposed generally diametrically opposite flat 51.

Figure 6:
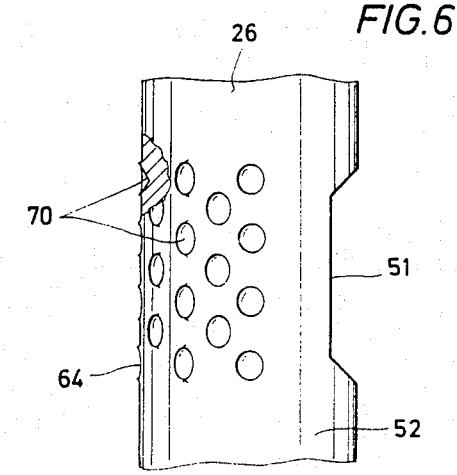
FIG. 6 is a view similar to FIG. 5 showing another form of shaft for use in the improved rotary valve assembly of the present invention.

In FIG. 6 there is shown another modified form of friction-inducing formation for use on shaft 26. The friction-inducing formations shown in FIG. 6 are comprised of dimples or depressions 70 formed in the engagement portion 64 of the outer surface 52 of shaft 26, dimples 70 serving as friction-inducing formations in basically the same manner as knurls 66 and 68.

While knurls and dimples have been shown as fiction-inducing formations, it will be appreciated that virtually any surface irregularity which results in greater frictional force between the engaged surfaces can be used. Also, while the friction-inducing formations are shown as being on shaft 26, they can alternately be on abutment surface 51. In either case, there will be increased frictional resistance between the shaft 26 and the valve element 22.

It can thus be seen that the present invention provides an improved valve assembly including means for securing a valve element to a valve shaft which eliminates the need for precise machining to close tolerances of the flat 51 or the torque transmission member 46. Nonetheless, the tight compressive engagement of torque transmission member 46 with shaft 26, coupled with the use of the friction-inducing formations, e.g. knurls 66, prevents rotative and axial play between the shaft 26 and the valve element 22. Moreover, should play develop as the valve is used and becomes worn, it can be easily corrected by further tightening of torque transmission member 46 in threaded bore 48 toward flat 51. Additionally, since torque transmission member 46, in the preferred case, is provided with tapered threads 58 which are received in the parallel threads 60 in bore 48, secure locking of torque transmission member 46 to the valve element 22 is assured.

The foregoing disclosure and description of the invention is illustrative and explanatory thereof, and various changes in the size, shape and materials as well as in the details of the illustrated construction may be made within the scope of the appended claims without departing from the spirit of the invention.

What is claimed is:

1. In a rotary valve assembly comprising a valve body, a rotary valve element disposed within said body and having a first bore herein coaxial with the axis of rotation of said valve element, and a shaft member rotatably mounted in said body and extending into said first bore in said valve element, the improvement comprising:

said valve element further having a second, threaded bore therein transverse to and intersecting said first bore;

a generally cylindrical torque transmission member threadedly received in said second bore whereby said torque transmission member can be compressively urged into engagement with said shaft member, said second bore having parallel threads and said torque transmission member having taped threads;

said first bore defining an abutment surface disposed generally opposite the intersection of said first bore and said second bore;

said shaft member having an outer surface comprising an engagement portion engageable with said abutment surface; whereby when said torque transmission member is compressively urged into engagement with said shaft member, said abutment surface and said engagement portion of said outer surface of said shaft member are urged into engagement.

2. The assembly of claim 1 wherein said outer surface of said shaft member comprises a generally cylindrical main portion interrupted by a flat, said flat being in register with said second bore and having circumferentially spaced side edges and axially spaced end edges, said flat being continuous with said cylindrical main portion at said side edges and spaced inwardly from said cylindrical main portion at said end edges.

3. The assembly of claim 2 wherein said torque transmission member has a substantially flat circular end face generally parallel to and abutting said flat.

4. The assembly of claim 1 wherein one of said abutment surface or said engagement portion of said outer surface of said shaft member has friction-inducing formations.

5. The assembly of claim 1 wherein said friction-inducing formations are on said engagement portion of said outer surface of said shaft member.

6. The assembly of claim 5 wherein said friction-engaging formations are defined by knurls on said engagement portion of said outer surface of said shaft member.

7. The assembly of claim 6 wherein said friction-inducing formations comprise dimples in said engagement portion of said outer surface of said shaft member.

8. The assembly of claim 1 wherein said valve element is a disk type element.

* * * * *